United States Patent Office 2,787,626
Patented Apr. 2, 1957

2,787,626

MANUFACTURE OF TRIETHYLALUMINUM

Horace E. Redman, Baton Rouge, La., assignor to Ethyl Corporation, New York, N. Y., a corporation of Delaware No Drawing. Application July 8, 1955,
Serial No. 520,899

3 Claims. (Cl. 260—448)

This invention relates to the manufacture of alkyl aluminum compounds, and more specifically to the generation of these compounds by the direct reaction of aluminum metal with hydrogen and an olefin. More specifically, the invention relates to a novel catalytic technique for the direct manufacture of these materials and in particular the manufacture of triethylaluminum, $(C_2H_5)_3Al$.

Triethylaluminum has been found to be a particularly useful organometallic material having great utility in organic synthesis generally, and more specifically, as a catalytic polymerization agent for the generation of straight chain polymers of ethylenically unsaturated hydrocarbons.

The alkyl aluminum compounds can be generated by the reaction of an alpha olefin, or terminally unsaturated olefin, with an aluminum hydride bonding. The aluminum hydride bonding may be that exhibited in aluminum hydride, or in the organometallic compounds of aluminum wherein the aluminum is partially alkylated and one or more substituents are hydrogen atoms. Examples of compounds of this latter variety are the monoalkyl aluminum dihydrides and the dialkyl aluminum hydrides. Unfortunately, the efficacy of this route to the fully alkylated aluminum compounds, and particularly triethylaluminum, is contingent upon a readily available and quite economical supply of aluminum hydride. As the manufacture of aluminum hydride customarily requires the use of a substantially excess of the expensive and relatively scarce material, lithium hydride, its use in the above described conventional procedure makes this prior process economically disadvantageous. Accordingly, the need exists for an economical, straightforward, and efficient process for the generation of triethylaluminum.

It is therefore an object of the present invention to provide an improved process for the preparation of triethylaluminum. Another object is to provide an economical and direct process for the manufacture of triethylaluminum directly from aluminum. Still another object is to provide a process involving a minimum of process steps and using moderate reaction conditions. More particularly, an object of the invention is to provide a novel catalytic process of the above type. Other objects and advantages will become apparent from the following description and examples.

It has now been found that triethylaluminum can be prepared directly from aluminum, hydrogen and ethylene. The present invention generally comprises the process of treating aluminum metal with ethylene and hydrogen in the presence of a liquid phase of triethylaluminum. The aluminum metal supplied is preferably in a comminuted form, e. g., as aluminum shavings prepared under nitrogen. In a specific embodiment of this invention, the process for preparing triethylaluminum comprises contacting the particulated aluminum with sufficient triethylaluminum to wet the metal surfaces and then heating the reaction zone to a temperature between about 30° and 130° C. under 10 to 300 atmospheres pressure of a gaseous mixture containing hydrogen and ethylene.

While the precise nature of the reaction mechanism is still uncertain, it is believed that the triethylaluminum activates the metallic aluminum by undergoing a disproportionation reaction forming an unstable intermediate which readily forms two moles of ethylaluminum hydrides. These hydrides would then add ethylene to form the triethylaluminum. Accordingly, although various contacting techniques are quite suitable for carrying out the process, it is preferred that the supply of aluminum shavings be initially wetted with a substantial quantity of triethylaluminum, and once having activated the metal and the reaction having been initiated, the operations are continued in such a manner that at least some of the additional triethylaluminum formed is retained in the liquid phase and hence continues to wet the aluminum surface. In one mode of carrying out this general type of embodiment of the present invention, the aluminum is normally provided in the form of sub-divided or comminuted solids which have been prepared under an entirely inert gas atmosphere such as, for example, argon, nitrogen, or methane. From such an atmosphere, oxygen or moisture should be preferably rigorously excluded. The aluminum solid supply is inserted within a reaction zone, taking precautions to prevent the contacting of any oxygen-containing gas or moisture therewith. A quantity of triethylaluminum sufficient to wet at least a portion of the aluminum solids is introduced into the reaction zone and the zone is then closed off except for conduits for admitting hydrogen and ethylene-containing gases. Hydrogen-containing gas is introduced into the reaction zone and the hydrogen pressure is built up to a desired operating level which is generally superatmospheric but below about 300 atmospheres. Concurrently or after attaining the desired hydrogen pressure an ethylene-containing gas is introduced into the reaction zone to a pressure which varies over a wide range but generally not greater than about 100 atmospheres partial pressure. The contents of the reactor are heated to the necessary temperature level and maintained at that level for a period which will vary according to the refinements in the apparatus available and the reaction conditions of temperature and pressure employed. During this contacting period, the contents are, preferably, continuously agitated by means of driven stirring devices or by the employment of a rocking reaction zone wherein the solids migrate sporadically from end to end of the reaction zone. In certain instances, a contacting time of the order of as high as about 20 hours will be found necessary although contacting times as low as 0.5 hour are also suitable under certain reaction conditions. This contacting time is ordinarily a function of the relative magnitude of the bed of sub-divided aluminum solids, the particle size of the aluminum, the pressure-temperature relationships of the reactants and the proportions of the reaction zone, e. g., the depth to superficial cross-sectional surface exposure ratio.

In other embodiments of the present invention, a sequential mode of reactant addition is employed. Thus, if desired, the aluminum particles are contacted with the hydrogen in the presence of the liquid triethylaluminum for a period sufficient to react at least a portion of the hydrogen at which time the desired amount of pressurized ethylene is introduced into the reaction zone to complete the reaction to the triethylaluminum.

The details of operation and the best method of carrying out the process will be illustrated by the following examples. All parts given are intended as parts by weight.

Example 1

About 25 parts of finely sub-divided aluminum metal is charged to an autoclave, under a dry, inert gaseous atmosphere of nitrogen. The aluminum is prepared by milling or filing in a dry nitrogen atmosphere. To this charge is added sufficient triethylaluminum $(C_2H_5)_3Al$, to thoroughly wet all the particles of aluminum, this amount being about 20 parts. The autoclave is closed, and a pressure of about 5 atmospheres of hydrogen gas and an additional 10 atmospheres of commercially pure ethylene gas is introduced to the autoclave. The contents are slowly stirred by means of an externally driven agitator and the temperature is raised from ambient levels to about 80°–85° C. The contacting is continued for a period of from 5 to 6 hours during which time the pressure is maintained in the range indicated above. At the conclusion of this period, the temperature is then lowered to about 20°–25° C., and excess reactants are let off. The autoclave vapor space is flushed with dry gaseous nitrogen for several cycles to thoroughly remove reactant components and the triethylaluminum is recovered by distillation. A high conversion of the aluminum metal to triethylaluminum is obtained, approaching the stoichiometric yield of 100 parts.

Example II

The procedure of Example I is repeated, except that the reactant gas pressures are raised to a partial pressure of about 50 atmospheres of hydrogen and 100 atmospheres of ethylene respectively. The contacting time is reduced to 4 to 5 hours and a good conversion is obtained with a high yield of triethylaluminum.

Example III

The same procedure as obtained in Example I was employed except that a hydrogen partial pressure of 50 atmospheres and an ethylene partial pressure of 100 atmospheres is employed. The reaction temperature is increased to about 125°–130° C. and contacting time is reduced to about 2 to 3 hours. A high conversion to triethylaluminum is provided.

Example IV

The procedure of Example I is repeated except that a hydrogen partial pressure of 290 atmospheres and an ethylene partial pressure of 10 atmospheres is employed. At a reaction temperature of about 125°–130° C. a contact time of only 0.5 hours results in a good conversion of the aluminum metal to triethylaluminum.

Example V

When the procedure of Example IV is repeated except that the reaction temperature employed is about 30°–40° C., high conversions to triethylaluminum are obtained with a contact time of about 20 hours.

In the foregoing examples the hydrogen-ethylene partial pressures are initially adjusted according to the desired proportions in which these components appear in the desired product. If more convenient, the gaseous reactant pressures may be sequentially adjusted and provided, thus in effect dividing the process into several stages. This technique is illustrated by the following example.

Example VI

A reactor is charged as in Example I but the amount of triethylaluminum employed is increased to about 50 parts. The reaction system is initially pressurized with about 50 atmospheres of substantially pure, dry hydrogen, and the reaction conducted at about 100° C. for about 3 hours. The autogenous pressure of the system at the conclusion of this period depending upon the relative volume of the reaction space and the volume of the charge, will be from 100 atmospheres down to about 50 atmospheres. At the conclusion of this treatment the temperature is reduced to 60°–65° C. and an additional 100 atmospheres pressure is applied to the reaction zone by the addition of gaseous ethylene. The contacting period is continued for an additional 4 hours after which time the reaction zone temperature is reduced to 20°–25° C. and the excess pressure is released. A high conversion of aluminum to triethylaluminum is obtained.

The gaseous pressures employed in the reactor can vary over a wide range, but generally do not exceed a total pressure within the reaction zone of about 300 atmospheres or fall below about 10 atmospheres. A preferred range is between 10 and 150 atmospheres. In general, a hydrogen partial pressure of between 3 and 290 atmospheres is suitable for all embodiments of the present invention. Normally, it is desired to employ enough ethylene pressure to have sufficient ethylene for the reaction, i. e., 2 moles of ethylene per mole of hydrogen reacted. Although the most preferred operation is obtained using super-atmospheric ethylene pressure the range of ethylene pressures employed can vary from as high as 100 atmospheres down to about 1 atmosphere. A preferred range, however, is between about 5 and 50 atmospheres. Although higher ethylene pressures than 100 atmospheres can be employed when desired, their use is generally unnecessary and ofttimes undesirable due to the losses in reactant materials occurred by numerous side reactions, i. e. ethylene polymerization and hydrogenation. When desired, various inert gases can be employed in addition to the ethylene and hydrogen in order to pressurize the reaction zone to a desired value while employing minimal quantities of the reactant gases.

As already discussed, the temperature of the present process can vary over a considerable range but in all embodiments of the invention it is desirable to maintain a correlated pressure-temperature relationship. Generally, higher operational pressures require lower reaction temperatures for a defined contact time in order to provide a comparable conversion to the desired product as is obtained at lower pressures. For the effective operation of the present process, temperatures between about 30° and 130° C. are generally applicable while particularly desirable results are obtained when operating at temperatures between about 60° and 90° C. While higher temperatures than 130° C. can be employed, their use is generally inadvisable because of the undesired side reactions, e. g., olefin polymerization, which normally occur at these temperatures in the presence of triethylaluminum and which result in losses of both ethylene and catalyst. In that embodiment of this invention, wherein a sequential addition of hydrogen and ethylene are employed, it is ofttimes desirable to employ a temperature of between about 100° and 130° C. or in some cases temperatures up to about 180° C. for the first or early phase of the reaction wherein only hydrogen is contacted with the aluminum and triethylaluminum to the exclusion of ethylene. After this first reaction step and concurrent with the addition of ethylene to the reaction zone the temperature can be reduced, preferably to a range between about 60°–80° C., in order to complete the reaction to triethylaluminum.

As heretofore mentioned, the contact time can also vary over a considerable range. By contact time is meant primarily the residence time of the reactants, i. e. aluminum, hydrogen, ethylene, triethylaluminum, in the reaction zone at reaction conditions. In all the various embodiments of the present invention, the guiding principle is that the time-temperature-pressure relationships are so adjusted as to provide the maximum conversion of the reactants to the desired triethylaluminum compounds and the minimum formation of undesired by-products. As noted above, the temperature and pressure of the operation are related to the contact time employed. Thus, decreasing the operational temperature and/or pressure generally results in a longer contact time requirement. Similarly, increasing either or both the operational temperature and/or pressure employed generally permits a substantial decrease in the contact time due to the resultant increase in reaction rates. In general, for the preferred embodiments of this invention, contact times can vary from 0.5 to about 20 hours and more preferable between about 3 and 6 hours.

The process can be carried out in either a batch or continuous operation. In most cases, continuous processing is desired for obvious economic reasons. In any event, the correlation of time-temperature-pressure noted above is generally maintained in either operation.

From the foregoing description it will be readily seen that the new reaction of the invention can be readily carried out by a number of varied and highly effective techniques and that the invention is susceptible of many different explicit forms limited only by the appended claims.

I claim:

1. A process for preparation of an ethylaluminum hydride comprising reacting triethylaluminum with aluminum metal and hydrogen at a superatmospheric pressure of up to about 300 atmospheres and forming thereby an ethylaluminum hydride from the aluminum metal.

2. A process for the preparation of triethylaluminum comprising first forming an ethylaluminum hydride by reacting triethylaluminum with aluminum metal and hydrogen at a pressure between about 10 to 300 atmospheres and at a reaction temperature between about 30 and 180° C., and subsequently reacting said ethylaluminum hydride with ethylene at a superatmospheric pressure of up to about 100 atmospheres and at a temperature between about 30 and 130° C. and recovering the triethylaluminum so formed.

3. In a process for preparation of triethylaluminum, the step of reacting triethylaluminum with aluminum metal and hydrogen at a superatmospheric pressure of up to about 300 atmospheres to form an ethylaluminum hydride from the aluminum metal and the triethylaluminum.

References Cited in the file of this patent

UNITED STATES PATENTS 2,271,956     Ruthruff  ---------------- Feb. 3, 1942

Notice of Adverse Decision in Interference

In Interference No. 88,888 involving Patent No. 2,787,626, H. E. Redman, Manufacture of triethylaluminum, final judgment adverse to the patentee was rendered March 21, 1961, as to claims 1 and 3.

[*Official Gazette May 2, 1961.*]